Patented Apr. 10, 1934

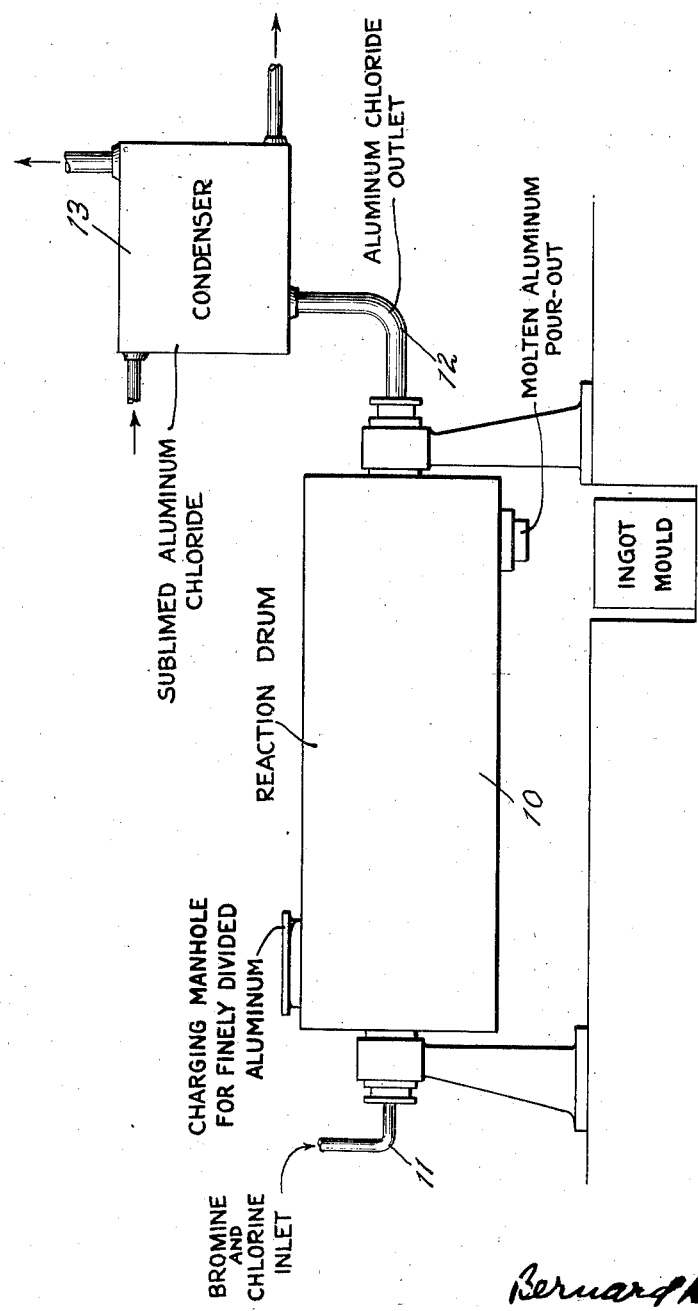

1,953,936

UNITED STATES PATENT OFFICE 1,953,936

METHOD OF TREATING METAL

Bernard H. Jacobson, Charleston, W. Va., assignor to Klipstein Chemical Processes, Inc., Newark, N. J., a corporation of New Jersey Application January 17, 1931, Serial No. 509,528

15 Claims. (Cl. 75—17)

This invention relates in general to a treatment of metal, either pure, in mixture or in the form of alloys, with gases capable of exothermic reaction therewith to produce a compound fusible or volatilizable at approximately the melting temperature of the metal or below, one portion of the heat of reaction being utilized to fuse or volatilize the compound produced, and another portion being utilized to melt a remainder of the metal so that it can be poured into ingots or otherwise recovered in partially or completely fused condition and substantially free from the compound produced. The fusing of the compound produced enables separation of the metal therefrom by stratification and tapping off. The volatilization of the compound produced enables separation of the metal therefrom by conducting the vapor into a separate chamber where condensation is effected. In either case the compound produced may represent an important product of the treatment.

The principles of the invention are applicable to the treatment of many different metals, such as for example, aluminum, zinc, tin, antimony, iron, and mixtures or alloys of any of these. Where mixtures or alloys of metals are treated, it is not necessasry that the gas be able to react with more than one of the metals, provided the heat of reaction is sufficient to melt a remaining portion of the metal and to fuse or volatilize the compound produced by the reaction. The gases most suitable for use in accordance with the invention are chlorine, hydrochloric acid, bromine and hydrobromic acid, though other gases capable of producing compounds of the metal fusible or volatilizable at approximately the melting point of the metal or below may be employed.

In many cases the obtaining of metal in ingot or consolidated form, from raw material in separate pieces, may in itself represent an important or even a major consideration for the adoption of the method. A particularly important embodiment of the invention resides, for example, in the treatment of scrap or finely divided aluminum or its alloys, with chlorine gas for the production of ingot metal and anhydrous aluminum chloride. A description of the details of such an embodiment will serve to clearly illustrate the principles involved and how they may be applied in practical operation.

The melting of scrap or finely divided aluminum, such as grindings, borings, and waste aluminum, has heretofore been attended with considerable difficulty. The total heat required to melt a given weight of aluminum is much greater than in the case of heavier non-ferrous metals, such as antimony, tin and copper. The supply of this quantity of heat from an external source through the metal wall of a furnace has the objection that the metal wall in such a heating method has to be at a much higher temperature than the molten aluminum, and the higher the temperature the more rapidly the metal wall deteriorates in contact with molten aluminum. Refractory linings obviously interfere with the transfer of heat from an external source through the furnace walls. Internal heating, as by reverberatory furnaces, is sometimes employed. In such furnaces considerable loss of aluminum occurs due to the formation of aluminum oxide.

It is known that chlorine, for example, will combine directly with aluminum, at temperatures from about 350° C. upward, and that by this reaction considerable heat is generated. This known reaction has been employed for the production of aluminum chloride from aluminum. The introduction of chlorine into molten aluminum presents a serious problem due to the rapidity with which the known refractory materials are attacked in the presence of chlorine and molten aluminum, and particularly in the case of the tube or tuyère where the chlorine enters the molten aluminum.

In accordance with this embodiment of my present invention, I am enabled to avoid the great difficulties which have been heretofore encountered in the melting of scrap or finely divided aluminum, and also in the production of anhydrous chloride of aluminum, by utilizing the heat of reaction between chlorine and a portion of the aluminum to raise the temperature of a remainder of the aluminum to the melting point and to melt it, thus producing ingot metal and anhydrous aluminum chloride in one and the same operation. The supply of chlorine to the aluminum, in accordance with my invention, is preferably directed through the separate pieces of solid aluminum. Theoretically, the action between 4 pounds of chlorine and 1 pound of aluminum generates sufficient heat to raise about 20 pounds of cold aluminum to the melting point and to melt it. The melting point of aluminum is in the neighborhood of 658° C., whereas the sublimation temperature of aluminum chloride is about 185° C. A certain amount of the heat generated by the formation of the chloride of aluminum is utilized in causing the volatilization of the chloride, and another portion is utilized in raising the temperature of the aluminum to the melting point and melting it. The reaction vessel is thus in effect a furnace, which is heated internally by the reaction occurring between the metal charge and the gas. When the aluminum remaining in the reaction furnace has all been melted, the supply of chlorine is discontinued and the molten metal may be poured into ingots.

The heat relations involved in the formation of aluminum chloride, and the melting of aluminum, may be calculated on the basis of a temperature of 700° C. as follows:—

Heat in 267 kgs. AlCl₃ at 185°=267× 0.20×185= 9879 cals.
Heat to vaporize 267 kgs. AlCl₃ at 185° (Trouton's law) =24 (185+273)= 10992 cals.
Heat in 267 kgs. AlCl₃ from 185° to 700°=267×515×.5= 20626 cals.
—————
41497 cals.

Heat of formation of Al₂Cl₆ at 0° 323600 cals. (Richards).

Subtracting 41497 cals. in the aluminum chloride vapors gives 282103 cals., or roughly 282100 cals. available for melting aluminum.

Heat in 1 kg. aluminum at 700° C.=258.3+43× .308 or 271.5 cals. and the heat required to raise 54 kgs. of aluminum to this temperature would be 54×271.5 cals.=14661 cals.

Dividing the heat available from formation of 267 kgs. AlCl₃, 282100 cals., by heat required to melt 54 kgs. aluminum, 14661 cals. gives 19.2 kgs. of aluminum, which can be melted for every kg. of aluminum which is converted into aluminum chloride.

In the above calculations it has been assumed that all the aluminum chloride leaves the reactor at 700° C. This in practice is not strictly true, since the aluminum chloride is volatilized at 185° C. and leaves the reactor at some mean temperature between 185° C. and 700° C., so that the heat to be carried off by the aluminum chloride is less than the figure indicated in the above calculation. Similar calculations in the case of other metals give, for example, a ratio of 18.2 kgs. of zinc, which can be melted for every kg. of zinc converted into zinc chloride at 450° C., a ratio of about 7. in the case of antimony, and a ratio of about 20 in the case of tin.

The specific heat and the latent heat of fusion of the aluminum, together with the rate at which the chlorine is supplied, jointly control the temperature rise in the furnace during the progress of the reaction, so that the ultimate temperature to which the furnace is exposed need not be greatly in excess of the melting point of aluminum. Due to this temperature control the attack on the furnace and its parts is correspondingly retarded, and furthermore the maintenance of an excess of aluminum so that free chlorine in contact with the furnace walls is largely avoided appears to minimize the attack of chlorine upon the furnace.

In the case of aluminum, the invention includes the treatment of a given quantity of aluminum with less than a chemical equivalent of chlorine, so that there will always remain an excess quantity of aluminum upon completion of the reaction. This principle may be embodied in practical use even though the excess aluminum is not completely fused to a state in which it can be poured. That is to say, the aluminum may be obtained as a sintered or agglomerated product of greatly reduced superficial area, in which state it is correspondingly less subject to oxidation in a subsequent melting operation for the pouring of the metal into the ingot molds. It is, however, usually preferable to supply sufficient chlorine to develop enough heat to complete the fusion of the aluminum within the chlorinating vessel or furnace.

In starting the reaction between chlorine and aluminum, the initial reaction temperature may advantageously be obtained by the preliminary introduction of a small quantity of bromine, which is known to react directly with aluminum at ordinary temperatures, and facilitates the reaction by which chlorine becomes combined with aluminum, as set forth in my prior patent, No. 1,445,082. This reaction between aluminum and bromine, which occurs at ordinary temperatures, is strongly exothermic, as also is the displacement of bromine from aluminum bromide by chlorine. Other known methods of obtaining the initial reaction temperature may, however, be employed, such as introducing the charge in an already heated condition, or heating it from an external source.

The accompanying drawing shows diagrammatically an arrangement of apparatus for carrying out the steps of the method.

An example of carrying out the method is as follows: 600 pounds of scrap aluminum are charged into a rotary iron drum 10 which has a chlorine inlet 11 leading into the finely divided metal at a point just below the level to which the molten metal will rise. An aluminum chloride outlet 12 leads from this reaction drum to a condenser 13 in which the sublimed aluminum chloride may be collected. 1 pound of bromine is first introduced through the chlorine inlet. This at once reacts directly with a portion of the aluminum. The chlorine gas is next introduced. The supply of chlorine is continued until 200 pounds have been passed in, by which time it will be found that a certain quantity of aluminum chloride has been produced and collected, and the remaining aluminum is in a fused state ready for pouring into molds. Tests on the quantities mentioned in this example have shown a recovery of 245 pounds of aluminum chloride and about 500 pounds of ingot aluminum, with a small metallic residue.

While I have referred more particularly to the treatment of aluminum, the invention also includes the treatment of aluminum alloys, and it is furthermore applicable to many other metals and alloys. For example, it may, as previously stated, be employed in the treatment of antimony, arsenic, bismuth, tin, iron and zinc, or alloys of any of these. The so-called scrap aluminum is commonly in the form of an alloy of, for example, aluminum and copper. In the treatment the gas may react with a part of the aluminum content without acting chemically upon the other metal, but nevertheless develop enough heat to melt the remainder of the entire metallic charge and to melt or volatilize the compound produced. Thus, in the treatment of alloys, it is to be noted that the method does not preclude the possibility of varying the composition of the alloy. This may be done by charging proper proportions of the necessary raw materials into the reaction chamber. If it should be desired to maintain the proportions of copper and aluminum in a given alloy, the charge may have a corresponding amount of aluminum added to the aluminum and copper, in order that the poured ingot will not be deficient in aluminum due to the amount converted into chloride. Similarly, the proportion of one or another component of an alloy may be either increased or decreased by proper selection and computation of the metal charge and the amount of chlorine introduced into the reaction furnace.

As an example of treating metal with a gas which reacts exothermally therewith to produce a compound fusible at about the melting point or below the melting point of the metal, I may mention the treatment of zinc with chlorine. The chlorination of 1 pound of zinc develops theoretically sufficient heat to melt the zinc chloride produced and about 18 pounds of zinc. The chloride in this case melts at about 365° C., whereas the zinc melts at about 419° C. The compound would form an upper layer of liquid on the molten zinc, so that by drawing off or tapping the one layer from the other, separation is readily effected.

Instead of making anhydrous chloride, it will, of course, be understood that the bromide or other compound may be produced in like manner, without departing from the principles and scope of my invention. I also wish to include the use of other halogenating agents, as for example, the halogen acids or other compounds capable of producing the corresponding salts.

I claim:—

1. The method of treating metal, which comprises treating the metal with a small quantity of bromine to produce a small quantity of bromide and generate heat, thereafter treating the metal, including the bromide, with chlorine to produce anhydrous chloride of a portion of the metal, utilizing a portion of the heat of reaction to melt a remaining portion of the metal, and separating the anhydrous chloride from such remaining portion of the metal.

2. The method of treating metal, which comprises treating the metal with a small quantity of bromine to produce a small quantity of bromide and generate heat, thereafter treating the metal, including the bromide, with chlorine to produce anhydrous chloride of a portion of the metal, utilizing a portion of the heat of reaction to melt the anhydrous chloride produced and a remaining portion of the metal, and separating the anhydrous chloride from such remaining portion of the metal.

3. The method of treating metal, which comprises treating the metal with a small quantity of bromine to produce a small quantity of bromide and generate heat, thereafter treating the metal, including the bromide, with chlorine to produce anhydrous chloride of a portion of the metal, utilizing a portion of the heat of reaction to volatilize the anhydrous chloride produced and separate it from a remaining portion of the metal, and utilizing another portion of the heat of reaction to melt such remaining portion of the metal.

4. The method of treating aluminum, which comprises treating the aluminum with a gas capable of exothermic reaction therewith to produce a halogen compound of a portion of the aluminum, utilizing a portion of the heat of reaction to melt a remaining portion of the aluminum and to remove the compound therefrom by volatilization of such compound, and withdrawing such melted portion of the aluminum from the locus of reaction.

5. The method of treating aluminum, which comprises treating aluminum with chlorine gas to produce a chloride of a portion of the aluminum, utilizing the heat of reaction to melt a remaining portion of the aluminum and to remove therefrom the chloride by volatilization, and removing such melted portion of the aluminum from the locus of reaction.

6. The method of treating aluminum, which comprises treating the aluminum with a small quantity of bromine to produce a small quantity of aluminum bromide and to generate heat, thereafter treating the aluminum, including the bromide, with chlorine to produce aluminum chloride of a portion of the aluminum, utilizing a portion of the heat of reaction to melt a remaining portion of the aluminum and to remove the chloride therefrom by volatilization, and removing such melted portion of the aluminum from the locus of reaction.

7. The method of consolidating aluminum, which comprises treating a quantity of aluminum in separate pieces with less than a chemical equivalent of chlorine to convert only a portion of the aluminum to chloride and to consolidate by fusion a remaining portion of the aluminum, and separately recovering the aluminum chloride and the consolidated aluminum.

8. The method of treating aluminum, which comprises chlorinating a charge of unmelted aluminum to a limited extent sufficient to volatilize by the heat of reaction the chloride produced and to melt by the heat of reaction the remaining aluminum, and separately recovering the aluminum chloride and the melted aluminum.

9. The method of obtaining ingot aluminum, which comprises treating a quantity of aluminum in separate pieces with less than a chemical equivalent of chlorine, to convert only a portion of the aluminum into chloride and to melt a remaining portion of the aluminum, separating the chloride from the melted aluminum, and separately solidifying the melted aluminum.

10. The process of recovering metallic aluminum from material containing metallic aluminum in relatively small particles, said process comprising causing at least five percent of the metallic aluminum to react with chlorine to form aluminum chloride, and utilizing the exothermic heat produced by said reaction to melt the remainder of the metallic aluminum into relatively small globules, and coalescing said globules into a body of molten metal which may be readily separated from the residue.

11. The process of transforming solid aluminum to molten form, which comprises introducing chlorine and said aluminum into a closed reaction space, said chlorine being less in amount than that required to combine with all of said aluminum within said reaction space, conserving the heat from the exothermic reaction between the aluminum and chlorine, removing the gaseous aluminum chloride from said reaction space and utilizing the heat formed from said reaction to melt the remainder of the aluminum.

12. The method of obtaining molten aluminum from material containing metallic aluminum in relatively small particles, which comprises introducing chlorine into a reaction space, introducing into said reaction space material in greater amount than sufficient to react with said chlorine, retaining within said reaction chamber the exothermic heat produced from the reaction between the aluminum and chlorine, removing the aluminum chloride from the reaction space and condensing the same, and agitating said aluminum containing material to coalesce the globules of molten aluminum.

13. The process of recovering aluminum from material such as borings, skimmings, and the like, wherein aluminum occurs in relatively small metallic particles, said process comprising introducing said aluminum-containing material and chlorine into a reaction chamber, said chlorine being less than sufficient to react with all of the metallic aluminum present but sufficient to react with at least five percent thereof, causing said chlorine to pass in a circuitous path through said material, whereby exothermic heat may be uniformly distributed throughout said material, and exerting continuously a rubbing action upon the globules of aluminum melted by said heat whereby to coalesce the same into a large body of molten aluminum which may be readily separated from the residue and removed from the reaction chamber.

14. The method of recovering metal from material containing the same, which consists in introducing said material into a reaction space, introducing into the material a gas capable of exothermic reaction therewith to produce a halogen compound of the metal, in a quantity less than that required to react with all of the metal, utilizing the exothermic heat of reaction to melt a remaining portion of the metal and to remove the compound by volatilization of such compound, and withdrawing such melted portion of the metal from the locus of the reaction.

15. The method of recovering metal from material containing the same, which consists in treating said material in a closed reaction space with a quantity of chlorine less than that required to react with all of the metal and produce a chloride of the metal, utilizing the exothermic heat of the reaction to melt a remaining portion of the metal and to remove the chloride by volatilization, and withdrawing such melted portion of the metal from the locus of the reaction.

BERNARD H. JACOBSON.